United States Patent
Gustavson et al.

[15] 3,646,776
[45] Mar. 7, 1972

[54] DRIVE SHAFT COUPLINGS

[72] Inventors: Lars-Goran Gustavson, Linnevagen 37, Aby; Per-Erik Lindqvist, Stjerneldsvagen 1, Norrkoping, both of Sweden

[22] Filed: Apr. 1, 1970

[21] Appl. No.: 24,518

[52] U.S. Cl. .................................................64/11 R, 64/31
[51] Int. Cl. .................................................F16d 3/16
[58] Field of Search..........................64/1, 4, 6, 11, 31, 23; 287/119

[56] References Cited

UNITED STATES PATENTS

| | | | |
|---|---|---|---|
| 2,598,780 | 6/1952 | Garnier | 64/1 |
| 2,468,182 | 4/1949 | Dempsey | 64/1 |
| 2,556,380 | 6/1951 | Stillwagon, Jr. | 64/1 |
| 2,567,127 | 9/1951 | Shoffner | 64/1 |

FOREIGN PATENTS OR APPLICATIONS 963,868   7/1964   Great Britain..............................64/1

*Primary Examiner*—Kenneth W. Sprague
*Attorney*—Munson & Fiddler

[57] ABSTRACT

A device for coupling together coaxial parts or sections of a drive shaft, which parts are arranged in series, the coupling device including a sleeve containing a resilient or compressible ring. One of the shaft sections, in one embodiment of the invention, has a shaft that extends through the resilient ring. A second shaft section has a tubular end portion that fits over one end of the sleeve and is attached to the sleeve by means of screws. The resilient ring permits a slight axial movement of the sleeve when the assembly or separation of the shaft sections is required, while also taking up any small linear deviations that may arise between the two coupled shaft sections.

6 Claims, 4 Drawing Figures

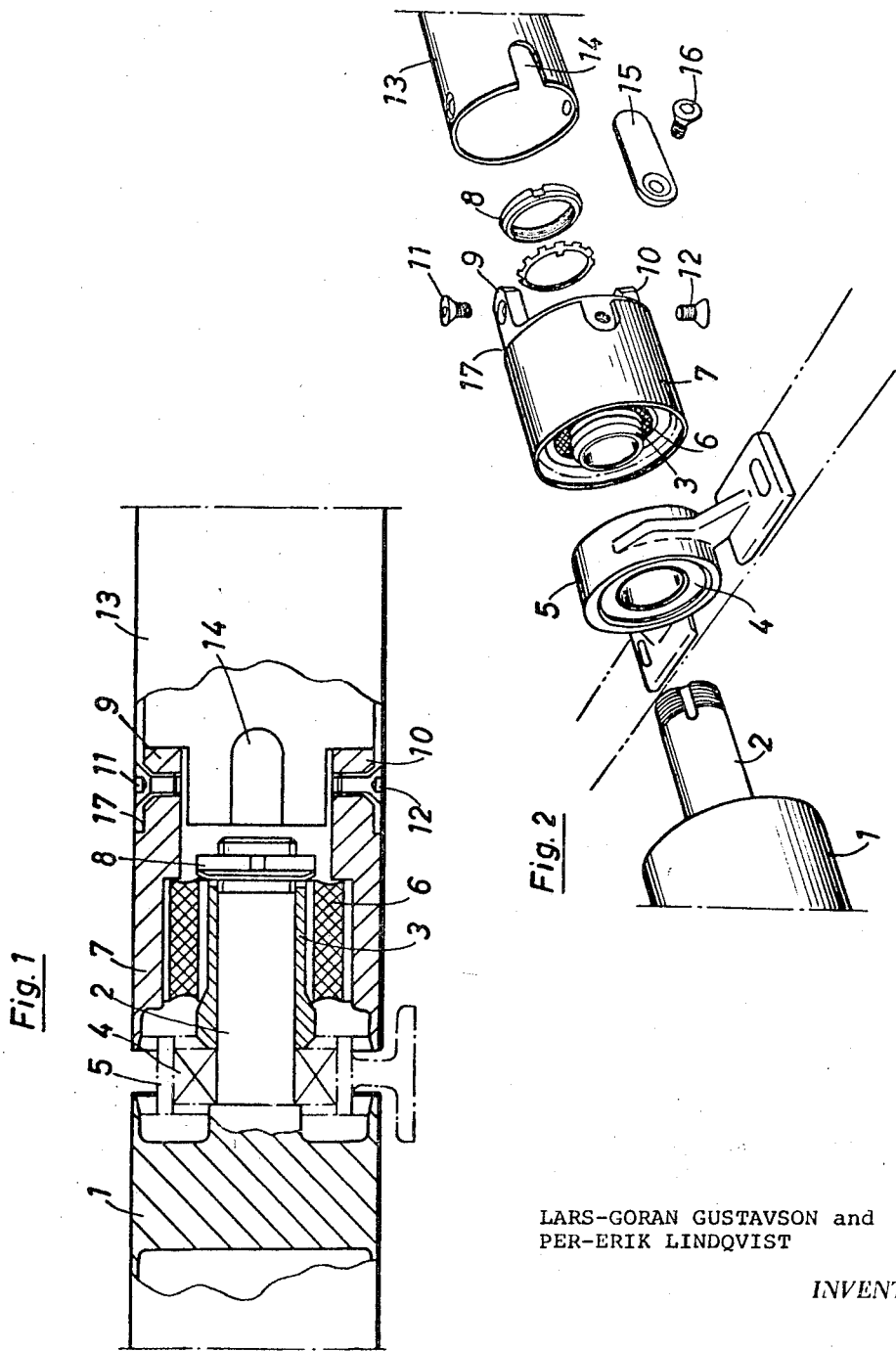

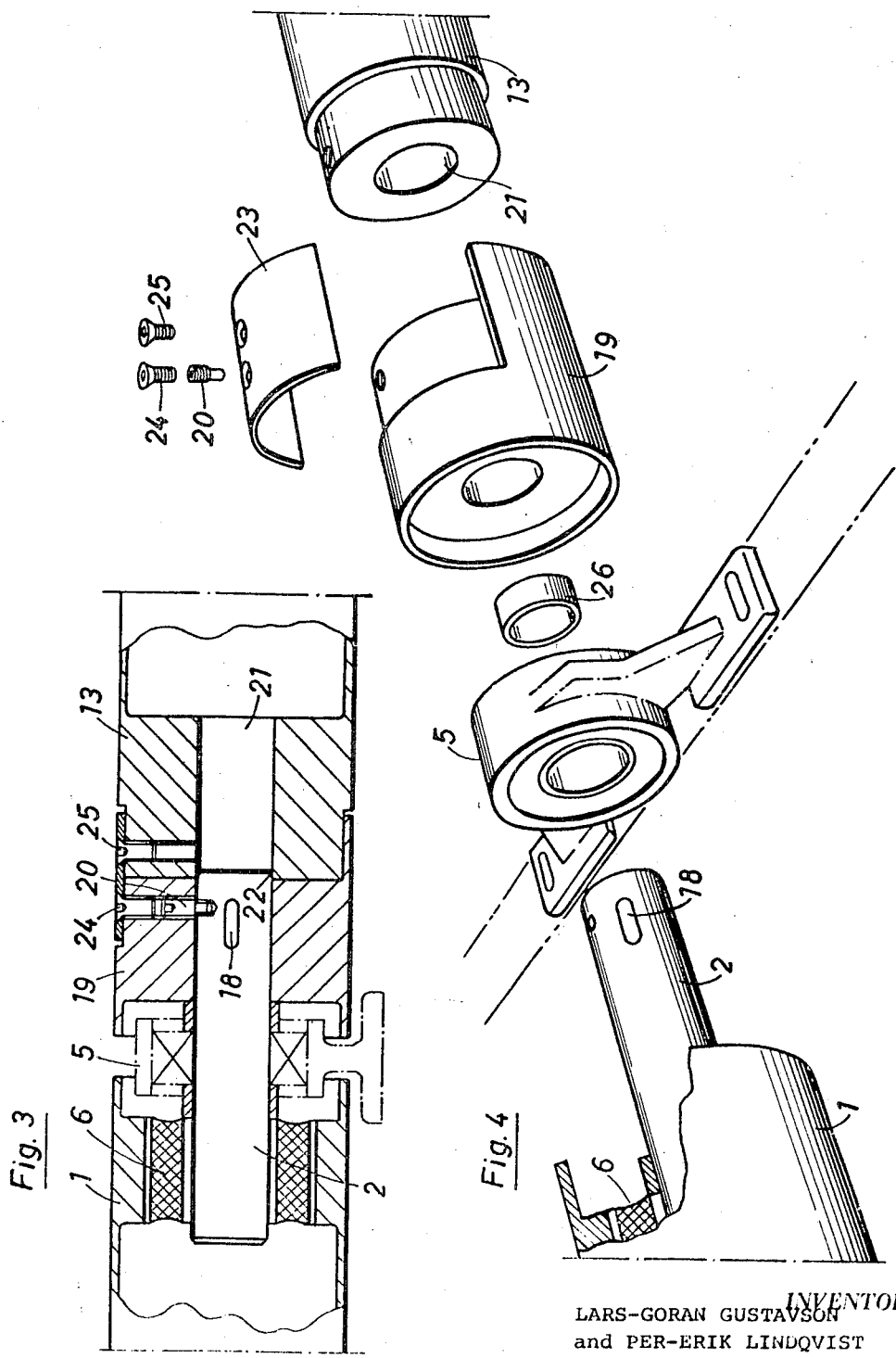

DRIVE SHAFT COUPLINGS

The present invention relates to a device adapted for coupling together coaxial shaft sections or parts that are arranged in series relationship, and which is so constructed that in addition to transmitting torque between the shaft sections and allowing a small angle between the center axes of said shaft sections, it can also be easily dismantled. That is to say, a shaft section can readily be assembled in position or dismantled without it being necessary to remove the adjacent shaft sections.

In the accompanying drawings, wherein illustrative embodiments of the invention are disclosed, FIG. 1 shows a longitudinal section through a coupling constructed in accordance with the invention;

FIG. 2 is an exploded view of the same coupling.

FIG. 3 is a longitudinal sectional view through a modified embodiment and

FIG. 4 is an exploded view of the arrangement of FIG. 3.

Referring to the drawings and more particularly to FIGS. 1 and 2 thereof, there is shown therein a shaft section 1 provided with a centrally arranged pin 2 which projects axially of the shaft section and on which is mounted a suitably slotted conical sleeve 3, against one end of which is a bearing 5 constituting a part of a ball bearing race race 4. Pressed onto the sleeve is a resilient or elastic element or ring 6 which is also pressed into a coupling sleeve 7. The ring 6 is held tensioned to the sleeve 3 by means of a nut 8.

Because of the conical shape of the sleeve 3, a tensioning effect is obtained and which causes the resilient element or ring 6 to be wedged fast on the sleeve 3. Hence an arrangement is provided whereby the torque from the shaft section 1 can be transmitted to the sleeve 7. The sleeve 7 is provided at its other end with two axially projecting lugs 9 and 10 which are provided with holes for receiving screws 11 and 12. The sleeve 7 is adapted to be connected to a tubular shaft section 13, which is provided with a slot 14 of such size and configuration that the lugs 9, 10 can be passed radially through it. The slot 14 is normally covered by means of a plate 15 which is locked to the sleeve 7 by means of a screw 16.

The sleeve 7 is provided at one end with a machined guide edge 17 on which the shaft section 13 rests, to transmit transverse forces together with the lugs 9 and 10. The shaft section 13 is in this way fixed to the sleeve 7. The movement is transmitted through the screws 11 and 12.

The separated parts of the coupling, shown in FIG. 2 are assembled in the following manner.

The shaft section 13 is placed adjacent to the coupling sleeve 7 so that the slot 14 registers with the lugs 9 and 10. The coupling is then moved axially to an extent which causes the edge of the tubular portion 13 to pass free of the guide edge 17. This is made possible because of the compressibility of the elastic element or ring 6. The shaft section 13 is then moved radially in over the coupling, so that the two lugs 9 and 10 come completely inside of the shaft section 13, whereupon the shaft section is turned through 90° to position the screw holes in the lugs for the screws 11 and 12 opposite to the holes provided in the shaft section 13. The coupling is then allowed to return axially so that the shaft section bears against the guide edge 17, permitting the screws 11 and 12 to be screwed into position to thereby connect shaft section 13 to the sleeve 7. Finally, the slot 14 is covered with the plate 15, which is fastened by means of the screw 16.

With the modified embodiment shown in FIGS. 3 and 4, the torque is transmitted from the shaft section 1, through the elastic element 6, to the pin 2 by means of a stop screw 20.

The shaft section 13 has a bore 21 whose diameter is slightly larger than that of the pin 2. The pin 2 projects slightly from the ring 19 into the bore 21, so that a small overlap is obtained. In this way a guide is obtained at 22.

When assembling the component parts, the shaft section 13, which at is other end has a similar elastic coupling, is moved slightly to the right, whereupon the shaft section can be passed over the pin 2 and the guiding effect at 22 is obtained. A centering of the parts is thereby obtained.

The ring 19 has an arcuate segmental portion 23, which enables the shaft section 13 to be radially removed or inserted. The portion 23 is removed on assembly and is replaced in position and secured to respective parts by the screws 24 and 25 which transfer the torque from the coupling to the shaft section 13 when the shaft section has been mounted in position. The reference numeral 26 indicates a spacing ring.

Because of the elastic or resilient insert employed in the coupling, permitting the coupling sleeve to have limited axial movement relatively to one of the shaft sections when required, the separation of the latter shaft section from another shaft section is easily and effectively attained. In addition, any slight linear deviation axially between the shaft sections is taken up by means of said elastic insert.

What is claimed is:

1. A device for coupling together two coaxial drive shaft sections comprising, a first shaft section having an extended centrally arranged axially extending pin, a conical sleeve fitted around the pin, a coupling sleeve containing a resilient and compressible annulus, the pin and its conical sleeve extending through the resilient annulus, a second shaft section having an end fitted around the coupling sleeve, said coupling sleeve being capable of a limited axial movement relatively to the first shaft section by reason of the compressibility of the resilient annulus, and means by which the second shaft section and the coupling sleeve are secured together.

2. A device for coupling together a series of coaxial drive shaft sections comprising, a first shaft section having an extended centrally arranged axially extending pin, a coupling sleeve including elastic torque-transmitting means, the pin extending through said elastic torque-transmitting means, a second shaft section having an end fitted around said coupling sleeve, the coupling sleeve having limited axial movement relatively to the first shaft section by reason of the compressibility of the resilient torque-transmitting means, and means by which the second shaft section and the coupling sleeve are secured together.

3. A device according to claim 2 having a sleeve fitted around the pin and extending through said elastic torque-transmitting means.

4. A device according to claim 2 in which said sleeve is conical.

5. A device according to claim 2 including a support bearing, said pin extending through said support bearing and being supported thereby.

6. A device according to claim 2 in which said coupling sleeve includes an axially extending guide edge and two diametrically opposed axially projecting apertured lugs, the second shaft section having a recess adapted to receive said lugs to guide said shaft section slidably on said guide edge, said second shaft section having openings adapted for alignment with the apertures on the lugs, said coupling sleeve and said second shaft section being rotatable with respect to one another to align said openings and said apertures for insertion thereinto of locking means to maintain connection between said shaft section and said coupling sleeve.

* * * * *